United States Patent [19]

Stickles et al.

[11] Patent Number: 5,307,637
[45] Date of Patent: May 3, 1994

[54] ANGLED MULTI-HOLE FILM COOLED SINGLE WALL COMBUSTOR DOME PLATE

[75] Inventors: Richard W. Stickles, Loveland; Howard L. Foltz, West Chester; Keith K. Taylor; George E. Cook, both of Cincinnati; Thomas MacLean, Loveland; Willard J. Dodds, West Chester, all of Ohio

[73] Assignee: General Electric Company, Cincinnati, Ohio

[21] Appl. No.: 910,911

[22] Filed: Jul. 9, 1992

[51] Int. Cl.$^5$ ............................................. F23R 3/04
[52] U.S. Cl. ........................................ 60/756; 60/755
[58] Field of Search ................ 60/752, 754, 755, 756, 60/757

[56] References Cited

U.S. PATENT DOCUMENTS

| | | | |
|---|---|---|---|
| 2,576,046 | 11/1951 | Scarth | 60/39.65 |
| 3,420,058 | 1/1969 | Howald | |
| 3,623,711 | 11/1971 | Thorstenson | 263/19 |
| 3,737,152 | 6/1973 | Wilson | |
| 4,050,241 | 9/1977 | DuBell | |
| 4,241,586 | 12/1980 | Caruel et al. | 60/756 |
| 4,380,905 | 4/1983 | Smart et al. | 60/756 |
| 4,422,300 | 12/1983 | Dierberger | 60/757 |
| 4,485,630 | 12/1984 | Kenworthy | |
| 4,567,730 | 2/1986 | Scott | |
| 4,695,247 | 9/1987 | Enzaki | 60/756 |
| 4,773,593 | 9/1988 | Auxier et al. | 239/127.3 |
| 4,790,140 | 12/1988 | Sato et al. | |
| 4,800,718 | 1/1989 | Zimmerman | |
| 4,878,283 | 11/1989 | McLean | 60/757 |
| 4,896,510 | 1/1990 | Folz | 60/752 |
| 4,934,145 | 6/1990 | Zeisser | 60/740 |
| 5,129,231 | 7/1992 | Becker et al. | 60/756 |

FOREIGN PATENT DOCUMENTS

| | | | |
|---|---|---|---|
| 994115 | 8/1976 | Canada | 60/756 |
| 802545 | 10/1958 | United Kingdom | 60/756 |
| 2221979 | 2/1990 | United Kingdom | |

OTHER PUBLICATIONS

"Advanced Low-Emissions Catalytic Combustor Program Phase 1 Final Report", by Dr. G. J. Sturgess, Prepared for NASA, Jun. 1981 NASA CR-159656.

"Alternate Cooling Configuration for Gas Turbine Combustion Systems", by D. A. Nealy, S. B. Reider, & H. C. Mongia, Prepared for Advisory Group for Aerospace Research and Development Propulsion and Energetics Panel, May, 1985.

"Film Cooling", by Richard J. Goldstein, pp. 321-379, prepared for Department of Mechanical Engineering, University of Minnesota, Minneapolis, Minn.

"Influence of Coolant Tube Curvature on Film Cooling Effectiveness as Detected by Infrared Imagery", by S. Stephen Papell, Robert W. Graham, and Richard P. Cagezo, prepared for Lewis Research Center, Cleveland, Ohio, 1979, NASA T.P. No. 1546.

*Primary Examiner*—Richard A. Bertsch
*Assistant Examiner*—Timothy S. Thorpe
*Attorney, Agent, or Firm*—Jerome C. Squillaro

[57] ABSTRACT

A gas turbine engine combustor is provided with a combustor dome plate film cooling means having an annular slotted ring to provide a film starting means upstream of a multi-hole film cooled single wall metal dome plate which is annular in shape. One particular embodiment provides a starting slot in the form of a plurality of rings surrounding the edges of the air/fuel nozzle inlet apertures in the dome plate. The cooling holes are disposed in concentric circles about the apertures and angled along radii emanating from the center of the apertures. This produces a cooling film emanating radially from the ring like circular slots around each air/fuel nozzle inlet aperture in the dome plate. Another embodiment provides a starting slot in the form of circumferential rails circumferentially disposed about the inner and outer circumferential edges of dome plate. The cooling holes are arranged in two section, the first to feed a radially inward directed cooling film that is initiated from an outer starting slot on a radially outer circumferential edge of the plate. The second sections has film cooling holes angled radially outward to feed a radially outward directed cooling film emanating an inner starting slot on a radially inward circumferential edge of the plate.

9 Claims, 4 Drawing Sheets

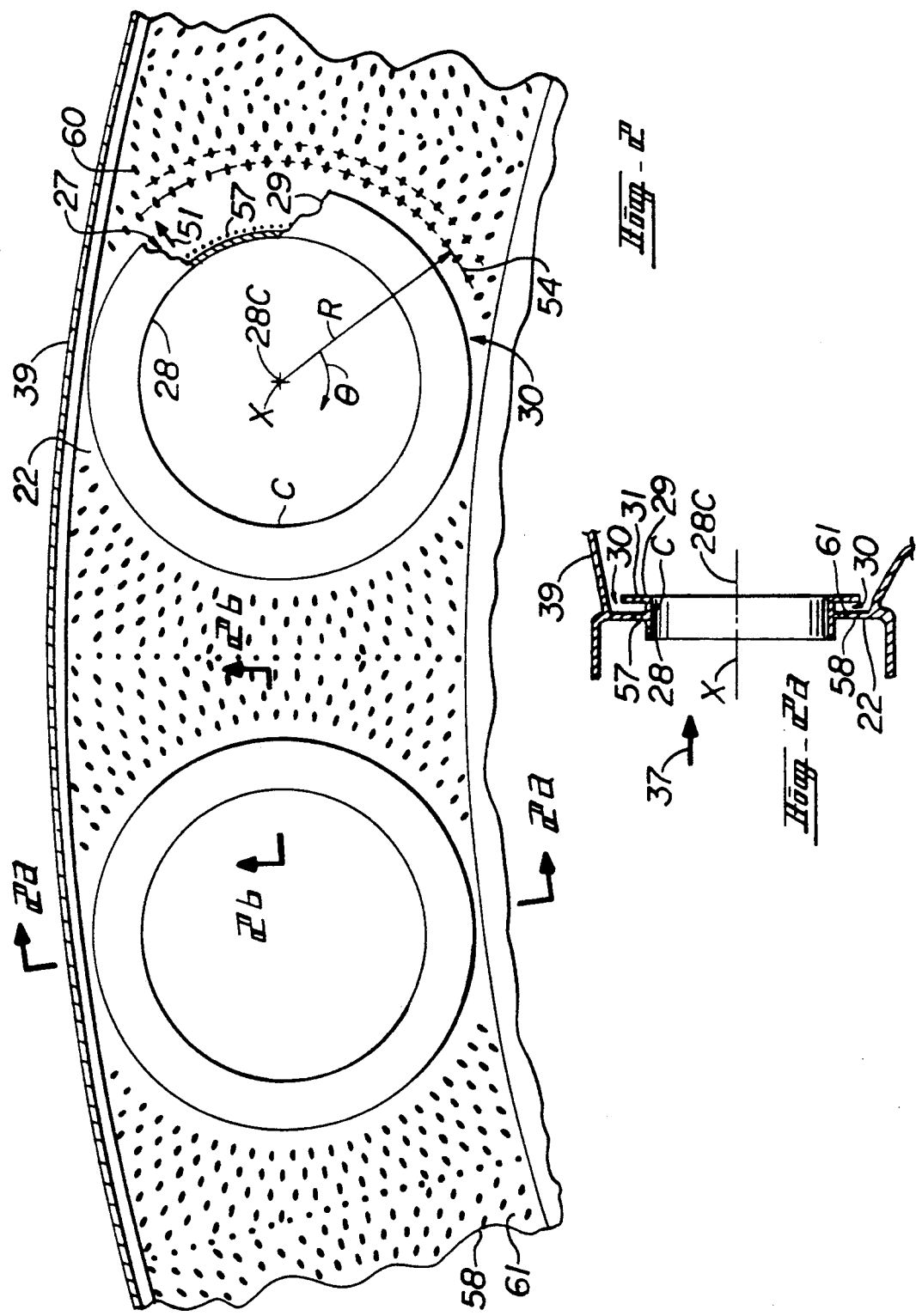

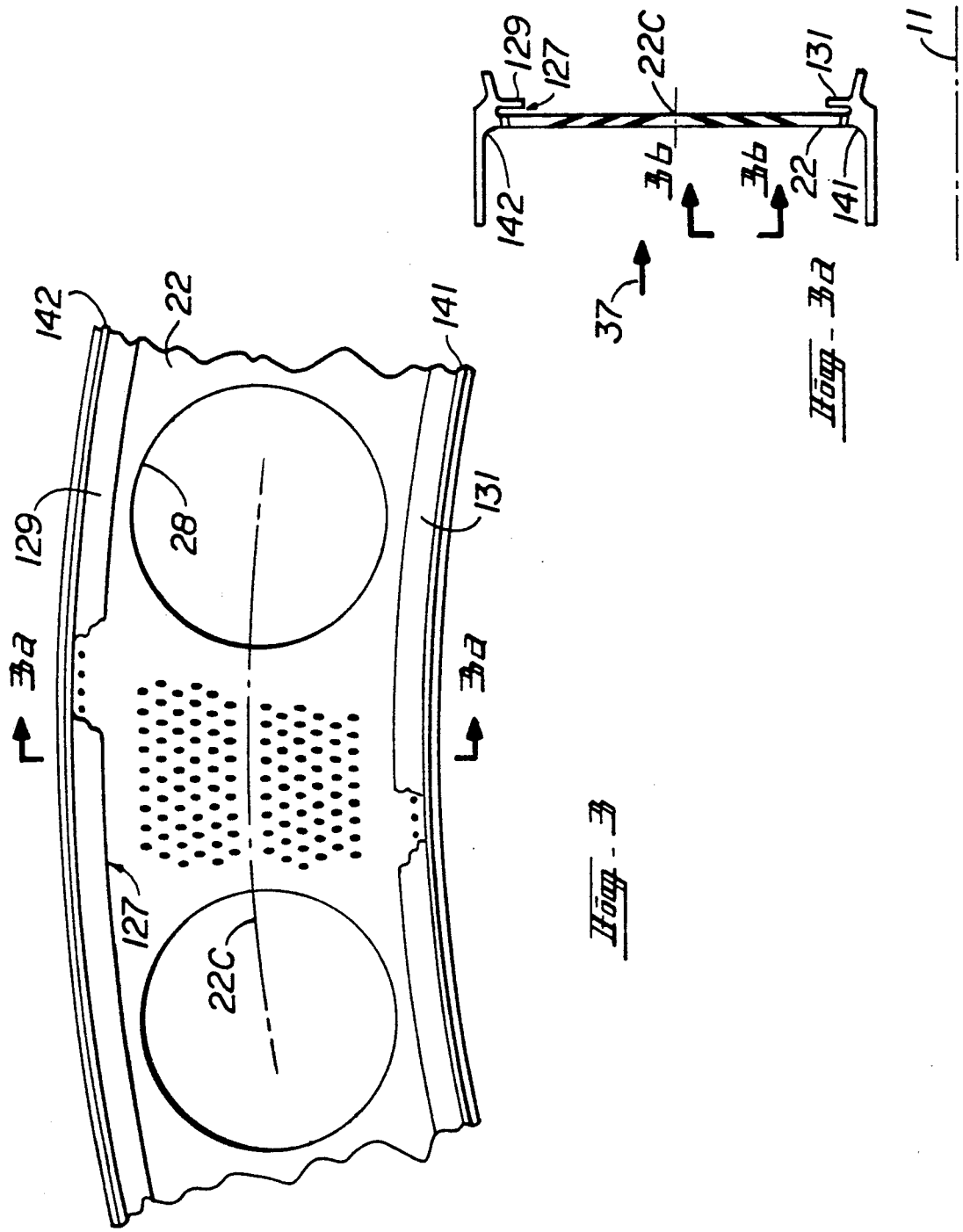

5,307,637

ANGLED MULTI-HOLE FILM COOLED SINGLE WALL COMBUSTOR DOME PLATE

BACKGROUND OF THE INVENTION

1. Field of the Invention

This invention relates to the cooling of combustor dome plates for use in gas turbine engines and more particularly to aircraft gas turbine engine combustors using film cooling for the dome plates.

2. Description of Related Art

Combustor domes generally define the beginning of the combustion section of a gas turbine engine which is located between the compressor and turbine sections of the engine. Combustor domes are used to support the fuel injectors and various air inlet devices to promote complete, efficient, and low pollution emitting combustion particularly in aircraft engine combustors. One such device is an air swirler that surrounds the apertures in the dome plate through which the fuel injectors are disposed in the combustor. Combustor sections generally further include an exterior casing and an interior combustor where fuel is burned producing a hot gas usually at an intensely high temperature such as 3,000° F. or even higher.

To prevent this intense heat from damaging the combustor before it exits to a turbine, a heat shield or combustor liner is conventionally provided in the interior of the combustor and on the dome plate of the combustor. The liner on the dome plate is often referred to as a splash plate and is particularly designed to shield the dome plate from radiation and the heat which it would induce in the plate. These non-structural segmented splash plates are impingement cooled by air passing through combustor dome impingement holes. Another source of potentially damaging heat is from the recirculating zones produced by the combustor air inlets including the swirlers. The recirculation scrubs hot air against the dome plate thereby further heating the dome plate by convection. This heat, particularly, that due to radiation, can warp and buckle the plate thereby damaging it as well as the air swirlers required to maintain optimum combustion conditions in the combustion zone.

Among the drawbacks of using protective liners or splash plates is that splash plates add weight, fabrication, complexity, and require significant impingement cooling air flow. These consequences are particularly undesirable in the design and manufacture of aircraft engines. Splash plate cooling is a source of unwanted hydrocarbon and carbon monoxide emmisions at low power engine settings. The impingement cooling air, after being used for cooling the splash plate, must exit the dome region and by so doing tends to quench the low power or idle flame in the combustor, thereby producing elevated levels of hydrocarbons and carbon monoxide. The present invention provides a multi-hole film cooling means to cool the dome plate without the need for a splash plate and the use of impingement cooling air.

Film cooling combustion liners downstream of the dome using circumferentially disposed rows of film cooling slots is well known as illustrated in U.S. Pat. No. 4,566,280 by Burr and U.S. Pat. No. 4,733,538 by Vdoviak et al. which are typified by a hollow annular ring, often referred to as a nugget, with cooling air feed holes operable to direct cooling air into the hollow chamber in the ring and slotted outlets. The outlets are operable to inject the cooling air onto the surface of the liner so as to entrain the cooling air in the boundary layer to form a cooling film over the hot surface of the liner.

Multi-hole film cooling has been developed for use in combustor liners and a more detailed discussion of the related art may be found in r U.S. Pat. No. 5,181,379 entitled "GAS TURBINE ENGINE MULTI-HOLE FILM COOLED COMBUSTOR LINER AND METHOD OF MANUFACTURE", invented by Wakeman et al., filed Nov. 15, 1990, assigned to the same assignee and U.S. patent application Ser. No. 07/631,855 entitled "MULTI-HOLE FILM COOLED COMBUSTOR LINER WITH SLOTTED FILM STARTER", by, Phillip D. Napoli, filed Dec. 21, 1990, assigned to the same assignee, and both are incorporated herein by reference.

Combustor domes do not have significant boundary layer flow along their hot surfaces as do combustor liners. Combustor dome plate flow is further distinguished from liner flow in that the combustor flow is generally a hot recirculatory jet flow generally perpendicular to and towards the dome plate unlike the flow along the combustor liner which is essentially parallel to the hot surfaces of the liner.

Combustor designers realize that effective film cooling, one which provides maximum film coverage, requires a great deal of cooling air and the multi-hole film cooled liner helps to minimize the amount of air used to accomplish this. The present invention provides a means for providing an effective combustor dome plate cooling film, increasing the film's effectiveness while realizing the efficiency benefits of the multi-hole designs.

SUMMARY OF THE INVENTION

The present invention provides a single wall multi-hole film cooling combustor dome plate having a multi-hole film cooling means and a slot type film starting means disposed upstream of the local downstream angled multi-hole film cooling holes in the dome plate.

One particular embodiment provides a starting slot in the form of a plurality of rings surrounding the edges of the air/fuel nozzle inlet apertures in the dome plate. The cooling holes are disposed in concentric circles about the apertures and angled along radii emanating from the center of the apertures. This produces a cooling film emanating radially from the ring like circular slots around each air/fuel nozzle inlet aperture in the dome plate Another embodiment provides a starting slot in the form of annular rails circumferentially disposed about the inner and outer circumferential edges of dome plate. The cooling holes are arranged in two section, the first to feed a radially inward directed cooling film from the outer starting slot on a radially outward portion of the plate. The second sections has film cooling holes angled radially outward to feed a radially outward directed cooling film from the inner starting slot on a radially inward portion of the plate. starting slot in the form of a plurality of rings surrounding the edges of the air/fuel nozzle inlet apertures in the dome plate. The cooling holes are disposed in concentric circles about the apertures and angled along radii emanating from the center of the apertures. This produces a cooling film emanating radially from the ring like circular slots around each air/fuel nozzle inlet aperture in the dome plate

ADVANTAGES

Combustor dome plates made in accordance with the present invention provide a hereunto before unknown means to film cool a gas turbine engine combustor dome plate and eliminate the need for splash plates. The multi-hole film cooled dome plate of the present invention dramatically reduces the amount of expensive cooling air needed to cool the dome. The present invention requires significantly less cooling air flow than domes incorporating splash plates which require significantly more cooling air flow for impingement cooling. The present invention is effective in protecting the dome from destructive heat from hot combustors and reduces weight, fabrication, and complexity compared to conventional designs, particularly ones using splash plates.

Another particular advantage of the present invention is that it reduces the amount of unwanted hydrocarbon and carbon monoxide emmisions at low power engine settings. This is due to a reduced amount of cooling air flow in the combustor dome region which causes flame quenching which is a source of hydrocarbon and carbon monoxide production.

BRIEF DESCRIPTION OF THE DRAWINGS

The foregoing aspects and other features of the invention are explained in the following description, taken in connection with the accompanying drawings where:

FIG. 2 is a partial aft looking forward view of one dome plate in the combustor dome in the core engine combustion section of the engine depicted in FIG. 1 and depicts one embodiment of a multi-hole film cooled dome plate in accordance with the present invention.

FIG. 2a is a cross-sectional view through a portion of the dome plate as indicated in FIG. 2.

FIG. 3 is a partial aft looking forward view of one dome plate in the combustor dome in the core engine combustion section of the engine depicted in FIG. 1 and depicts a second embodiment of a multi-hole film cooled dome plate in accordance with the present invention.

FIG. 3a is a cross-sectional view through a portion of the dome plate as indicated in FIG. 3.

FIG. 3b is a partial perspective view through a portion of the dome plate as indicated in FIG. 3a.

DETAILED DESCRIPTION OF THE INVENTION

Figure 1:
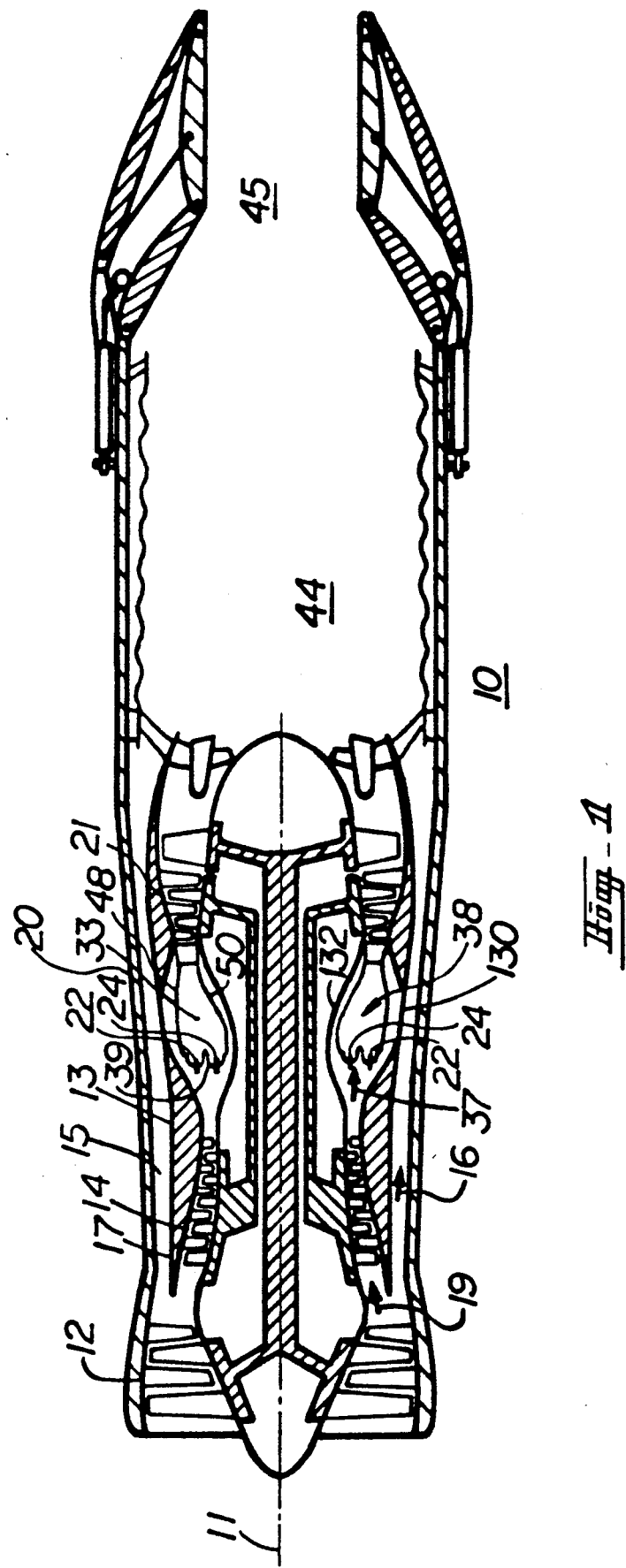
FIG. 1 is a diagrammatic view of a typical gas turbine engine including a core engine combustion section.

The gas turbine engine of FIG. 1 represents a conventional aircraft gas turbine engine having a combustion section combustor and afterburner employing combustor dome plates of the present invention.

Referring to FIG. 1, a typical gas turbine engine having an engine centerline 11 is shown comprising a fan section 12 which is in serial flow relationship with an engine core 13 and with a bypass duct 15 which is generally disposed, in concentric fashion, about the engine core. Flow from engine core 13 and bypass duct 15 is discharged to an exhaust section 44 having a nozzle 45 used to help produce thrust. A splitter 17 bypasses a portion of the air flow, referred to as bypass flow 16, from fan section 12 through bypass duct 15 around engine core 13. The remaining airflow, referred to as core air flow 19, is compressed by compressor 14 and discharged to a combustion section 20. Combustion section 20 is depicted comprising a combustor assembly 38 positioned in the compressor discharge flow 37 between an outer combustor casing 130 and an inner combustor casing 132 in energized fluid supply communication with the turbine section 21. The combustor assembly 38 is illustrated as being of the annular double dome combustor type having an annular combustor dome 39 and circumferentially extending outer and inner combustor dome plates 22 and 24, respectively. Extending aft from combustor dome 39 are outer and inner annular combustor liners 48 and 50 which are radially spaced from each other to define a portion of annular combustion flow path or combustion zone 33 therebetween where a portion of core flow 19 is mixed with fuel and the resultant mixture is combusted. The combustion section produces hot combustion gases which are mixed with the remainder of the compressor discharge flow and the resulting heated effluent is then flowed to turbine section 21 which powers compressor section 14 and fan section 12.

The invention is illustrated for use in double dome annular combustors characterized by annular inner and outer liners radially extending from a combustor dome having annular inner and outer dome plates wherein each dome plate has a ring of air/fuel nozzle inlet apertures designed to receive corresponding air/fuel nozzles. The invention is also applicable to domes of one or more rings and to can annular combustors typically having a plurality of combustor cans disposed circumferentially about a combustor centerline within a combustor section of a gas turbine engine.

Exhaust section 44 receives hot air from turbine section 21 and relatively cold bypass air 16 from bypass. duct 15 and is provided with a nozzle 45 for producing thrust.

Illustrated in FIGS. 2 and 2a is a first embodiment of a multi-hole film cooled combustor dome plate 22 illustrated as a circumferentially extending outer combustor dome plates 22. The dome plate 22 contains a plurality of air/fuel nozzle inlet apertures 28 circumferentially disposed in a ring about the dome plate for receiving conventional fuel nozzles and annular air swirlers (not shown). The air swirlers may be fixedly mounted within apertures 28 while the fuel nozzle may be slidably insertable within the aperture.

The first embodiment of the present invention provides a multi-hole film cooled outer dome plates 22 with a slotted film starting means 27 in the form of a cooling film ring 29 having an inverted L shaped cross-section 31 fitting over film slot cooling air feed holes 57 surrounding the circumference C of the air/fuel nozzle aperture 28 between the aperture's circumference C. The feed holes 57 allow cooling air to pass through combustor dome 39 to feed a cooling film slot 30, which is radially oriented with respect to a centerline 28C of aperture 28 to direct a cooling film radially outward along radii R. The radially oriented cooling film slot 30 operates in conjunction with multi-hole cooling film holes 60 that are distributed along film cooling hole rings 54 that are concentric to the film slot rings. The multi-hole film cooling holes 60 are also radially oriented with respect to the center 28C of aperture 28 (as can be seen with more particularity in FIG. 2B) such that film cooling air flow, having the compressor discharge air 37 as its source, emerges from these holes in a downstream cooling flow direction 51 from the cold side 58 of the combustor dome plate to the hot side 61 of the combustor dome plate in a direction along the radii R and radially outward from the cooling film ring 29.

Figure 2B:
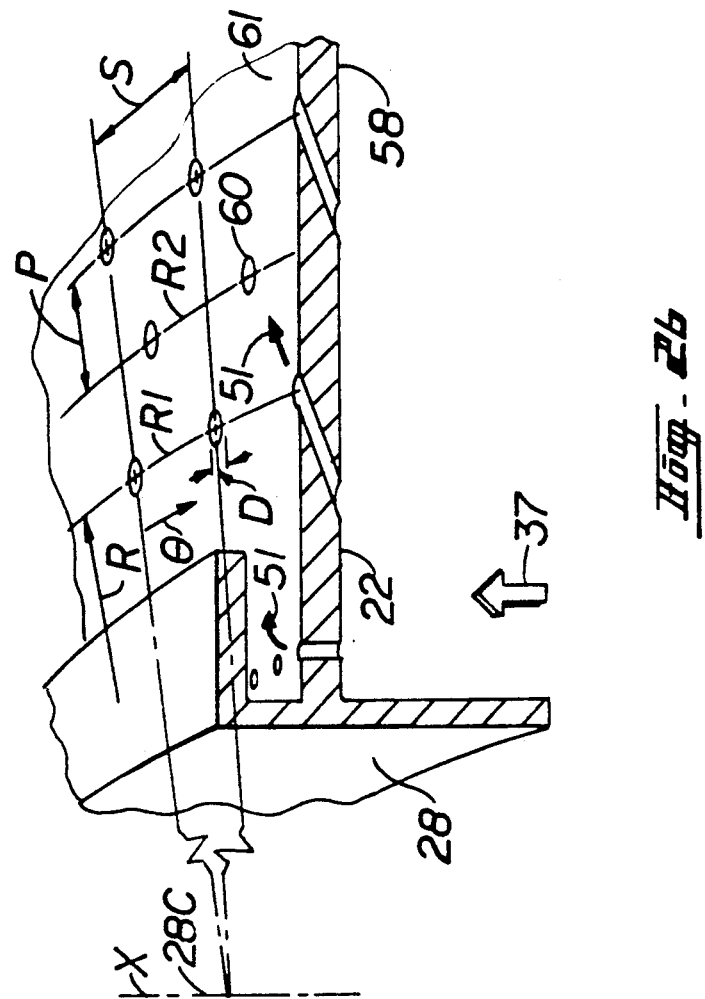
FIG. 2b is a partial perspective view through a portion of the dome plate as indicated in FIG. 2.

Referring to FIG. 2b, a cylindrical frame of reference is provided having a longitudinal axis labelled X, passing through the center 28C of air/fuel nozzle inlet aperture 28, and a radial axis R, and an angular coordinate Θ. The compressor discharge flow 37 provides cooling film cooling air in the downstream cooling flow direction 51 along the hot surface 61 of the outer dome plate 22 is in the positive R direction away from the center C. The multi-hole film cooling holes 60 are very small diameter closely spaced together apertures that are sharply angled downstream from the cold surface 58 to the hot surface 61 at a slant angle in the range of about 15° to 30°, preferably 20°.

FIG. 2B illustrates an exemplary embodiment of a multi-hole film cooling hole pattern that provides circumferentially adjacent multi-hole cooling holes 60 having an intra-ring spacing S and an inter-ring spacing P, between axially adjacent rows or rings R1 and R2 of multi-hole film cooling holes 60, that varies, preferably, in a range of about 6½ to 8½ hole diameters D. In order to provide a more even circumferential distribution of cooling air, axially adjacent rings R1 and R2 of multi-hole film cooling holes 60 are circumferentially offset or staggered by about half the angle or distance between circumferentially adjacent holes or by half the axial distance between row R2 and the previous row R1 of cooling holes. This is done to further enhance the evenness and effectiveness of the cooling film.

A second embodiment illustrated in FIGS. 3 and 3a provides an alternative slotted film starting means 127 in the form of an annular outer rail 129 and an annular inner rail 131 having an inverted L shaped cross-sections fitting over inner and outer rings of film slot cooling air holes annularly disposed near the outer and inner annular edges 142 and 141 respectively of the dome plate 22. The outer rail 129 and inner rail 131 direct the film starting cooling air radially inward and radially outward towards the dome plate center 22C of the dome plate 22, wherein radial direction is referenced to the combustor centerline, which in the case of an annular combustor coincides with the engine centerline 11.

Figure 3B:
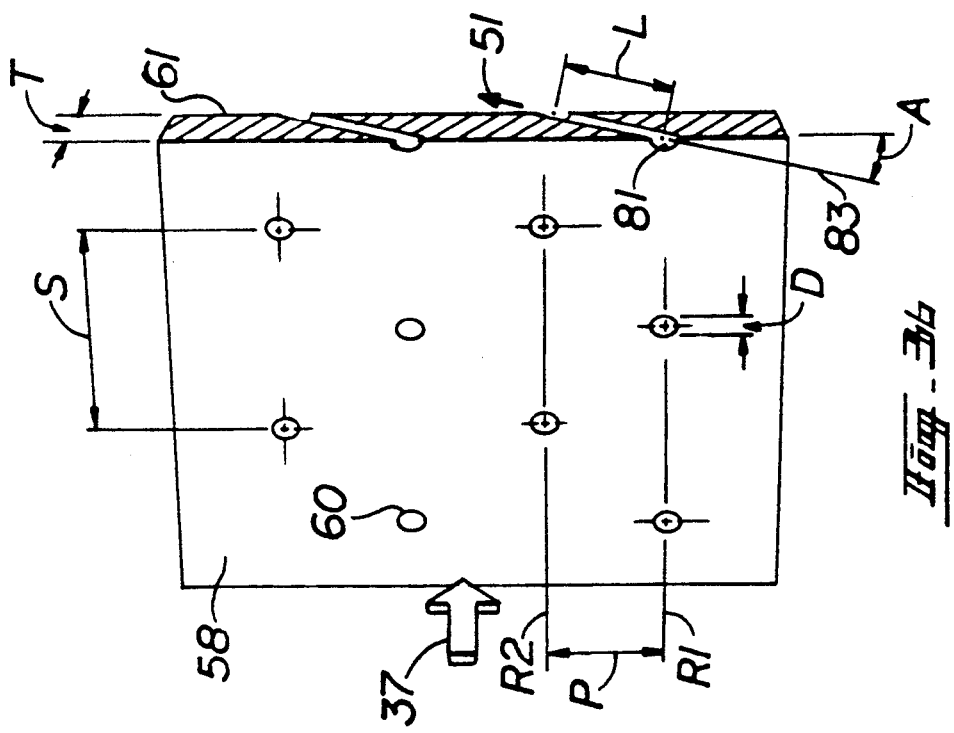

Referring to FIG. 3b, dome plate thickness T, multi-hole film cooling hole spacing S (the distance between cooling hole center-lines 83), film cooling hole length L and diameter D, and cooling hole slant angle A of multi-hole film cooling holes 60 are a function of the cooling flow requirements to meet the durability characteristics of the particular engine in which it is used. Slant angle A has been a preferred range of about 15° to 20°, and a preferred angle of about 20°. Preferably, the combustor dome plates have a thermal barrier coating on their hot side 61 to further reduce the heat load into the dome plates. Multi-hole film cooling holes 60 are laser drilled holes. Typically combustor dome plate wall thickness T is sized to meet both mechanical loading requirements and to allow the cooling flow through multi-hole film cooling hole 60 to develop an adequate length to diameter ratio (L/D) of least 10. and preferably larger. This minimum L/D is required to form a good film and to maximize convective cooling along an internal cooling hole surface 81 within multi-hole film cooling hole 60. We have also found that the cooling holes should be spaced about 7 diameters apart from each other or between center-lines 83 of adjacent multi-hole film cooling holes 60. The exemplary embodiment illustrated herein provides circumferentially adjacent multi-hole film cooling holes 60 having an inter-hole spacing S about 6½ to 7½ hole diameters D and an inter-row spacing P between axially adjacent rows R1 and R2 of multi-hole film cooling holes 60 in the same range. In order to provide a more even distribution of cooling air, axially adjacent rows R1 and R2 of multi-hole film cooling holes 60 are circumferentially offset by about half the angle or distance between circumferentially adjacent holes or by half the axial distance between row R2 and the previous row R1 of cooling holes. This is provided to further enhance the evenness and effectiveness of the cooling film.

While the preferred embodiment of our invention has been described fully in order to explain its principles, it is understood that various modifications or alterations may be made to the preferred embodiment without departing from the scope of the invention as set forth in the appended claims.

We claim:

1. An annular gas turbine combustor dome comprising:
   an annular combustor dome consisting of a single wall combustor dome plate disposed directly in a gas turbine engine flowpath and having a hot surface and a cold surface,
   a plurality of air/fuel nozzle inlet apertures disposed through said plate,
   and at least one continuous pattern of small, closely spaced, and sharply angled multi-hole film cooling holes angled in a downstream cooling flow direction from said cold surface to said hot surface, and
   said film cooling holes having a hole diameter, a downstream slant angle, and spaced at least sufficiently close enough together to effect a cooling film on said hot surface of said plate during combustor operation.

2. A gas turbine combustor dome as claimed in claim 1 further comprising a slot type cooling film starting means upstream of said multi-hole film cooling holes with respect to cooling flow direction.

3. A gas turbine combustor dome as claimed in claim 2 wherein said slot type cooling film starting means comprises an annular slot.

4. A gas turbine combustor dome as claimed in claim 3 further comprising a plurality of air/fuel nozzle apertures disposed through said dome plate,
   wherein said annular slot is formed from an annular cooling ring circumferentially disposed about the circumference of said aperture,
   said cooling ring having an inverted L shaped cross-section,
   said slot type cooling film starting means having a plurality of feed holes disposed through said plate beneath said cooling ring, and
   said slot effective to flow a cooling film along said hot surface of said plate.

5. A gas turbine combustor dome as claimed in claim 4 wherein said pattern comprises said multi-hole film cooling holes arranged in concentric circles about said cooling ring and said holes are oriented in a direction along radii extending from the centers of said apertures.

6. A gas turbine combustor dome as claimed in claim 3 wherein said slant angle has a value in a range of about between fifteen and thirty degrees.

7. A gas turbine combustor dome as claimed in claim 3 wherein said slant angle has a value of about fifteen degrees.

8. A gas turbine combustor dome comprising:
- an annular combustor dome plate having a hot surface and a cold surface,
- a plurality of air/fuel nozzle inlet apertures disposed through said plate,
- at least one continuous pattern of small, closely spaced, and sharply angled multi-hole film cooling holes angled in a downstream cooling flow direction from said cold surface to said hot surface,
- said film cooling holes having a hole diameter, a downstream slant angle, and spaced at least sufficiently close enough together to effect a cooling film on said hot surface of said plate during combustor operation,
- a slot type cooling film starting means upstream of said multi-hole film cooling holes with respect to cooling flow direction wherein said slot type cooling film starting means comprises an annular slot formed from an annular rail circumferentially disposed about a corresponding circumferential edge of said plate and having an inverted L shaped cross-section,
- said slot type cooling film starting means having a plurality of feed holes disposed through said plate beneath said rail, and
- said slot effective to flow a cooling film along said hot surface of said plate.

9. A gas turbine combustor dome as claimed in claim 8 wherein said slot type cooling film starting means further comprises:
- a radially inner slot and a radially outer slot circumferentially disposed about said corresponding inner and outer circumferential edges of said plate,
- said inner and outer slots formed from an inner circumferential rail and an outer circumferential rail circumferentially disposed about corresponding inner and outer circumferential edges respectively of said plate,
- said plate having two patterns of said multi-hole film cooling holes,
- wherein a radially outer pattern disposed in a radially outer portion of said plate have said multi-hole film cooling holes angled through said plate radially inward with respect to said outer edge of said plate, and
- wherein a radially inner pattern disposed in a radially inner portion of said plate have said multi-hole film cooling holes angled through said plate radially outward with respect to said inner edge of said plate.

* * * * *